United States Patent [19]

Lin

[11] Patent Number: 4,755,946

[45] Date of Patent: Jul. 5, 1988

[54] MOTOR ACTUATED ANTI-LOCK BRAKE CONTROL SYSTEM

[75] Inventor: William C. W. Lin, Troy, Mich.

[73] Assignee: General Motors Corporation, Detroit, Mich.

[21] Appl. No.: 933,211

[22] Filed: Nov. 21, 1986

[51] Int. Cl.$^4$ .............................................. B60T 8/60
[52] U.S. Cl. ................................. 364/426; 303/100; 303/DIG. 4
[58] Field of Search ...................... 364/426; 180/179; 303/100, 104, 110, 111, 112, DIG. 4

[56] References Cited

U.S. PATENT DOCUMENTS

4,664,453  5/1987  Kade et al. ........................ 303/100
4,673,225  6/1987  Kade ................................. 303/100

Primary Examiner—Gary Chin
Attorney, Agent, or Firm—Howard N. Conkey

[57] ABSTRACT

A wheel lock control system is described for a wheel braking system that includes a motor driven actuator for applying controlled hydraulic pressure to the wheel brake. The component of the motor current representing the brake pressure is determined and the motor current corresponding to the brake pressure producing the maximum possible braking effort during each brake pressure application is identified and reapplied to the motor after an incipient wheel lockup condition is sensed.

4 Claims, 6 Drawing Sheets

Fig. 9

MOTOR ACTUATED ANTI-LOCK BRAKE CONTROL SYSTEM

BACKGROUND OF THE INVENTION

This invention relates to an anti-lock control system for vehicle wheel brakes in which the actuator for establishing the braking pressure is provided by operation of an electric motor.

When the brakes of a vehicle are applied, a braking force between the wheel and the road surface is generated that is dependent upon various parameters including the road surface condition and the amount of slip between the wheel and the road surface. For a given road surface, the force between the wheel and the road surface increases with increasing slip values to a peak force occurring at a critical wheel slip value. As the value of wheel slip increases beyond the critical slip value, the force between the wheel and the road surface decreases. Stable braking results when the slip value is equal to or less than the critical slip value. However, when the slip value becomes greater than the critical slip value, braking becomes unstable resulting in sudden wheel lockup, reducing vehicle stopping distance and deterioration in the lateral stability of the vehicle.

U.S. application Ser. No. 789,576 filed on Oct. 21, 1985, now U.S. Pat. No. 4,664,453, and assigned to the assignee of this invention describes a wheel lock control system for preventing the wheels of a vehicle from locking up while being braked. In this system, the wheel brake pressure that results in the wheel slip being at the critical slip value and which produces substantially the maximum braking force between the tire and the road surface is identified. When an incipient wheel lockup condition is detected, the brake pressure so identified is then applied to the wheel brake so as to substantially continuously establish the critical slip value between the wheel and the road surface resulting in the maximum possible braking effort.

The brake pressure producing substantially the critical slip value and therefore substantially the maximum braking force is identified in the above system by repeatedly calculating the braking force between the wheel and the road surface during braking based on an equation defining the motion of a free body consisting of the wheel, tire and the brake. This equation utilizes measured values and system constants that are based on, for example, brake lining coefficient of friction and area and wheel radius. The measured brake pressure corresponding in time to the peak calculated force is stored. When an incipient wheel lockup is detected indicating that the critical wheel slip value establishing the peak braking force between the wheel and road surface has been exceeded, the stored brake pressure is the pressure that produced substantially the peak braking force. After detection of an incipient wheel lockup condition, the process of identifying the brake pressure producing the peak braking force is ended and the brake pressure is dumped to allow the wheel to recover from the incipient wheel lockup condition. When recovery is sensed, the stored brake pressure that produced substantially the peak braking force is reestablished to establish a braking condition in which the wheel slip is substantially at the critical slip value for the existing road-tire interface condition.

The wheel brake pressure is controlled in the aforementioned system by means of a brake pressure control actuator that includes a reversible electric motor and a motor driven actuating mechanism. The actuating mechanism is operatively connected to a piston in a cylinder which is reciprocally movable in the cylinder to increase and decrease the displacement volume in the cylinder and therefore generate brake actuating pressures therein when the actuator is actuated. Also, in the aforementioned system, the control of the electric motor to establish braking pressures is established based on the measurement of the braking pressure established by the actuator and applied to the brakes of the wheel.

SUMMARY OF THE INVENTION

The subject invention is directed toward the form of wheel lock control system as described in the aforementioned U.S. application Ser. No. 789,576 that includes a DC torque motor driven actuator for establishing the hydraulic brake pressure applied to the brake cylinders of a wheel brake. In accord with this invention, the brake pressure establishing substantially the critical slip value and therefore the maximum braking force is identified and when an incipient wheel lockup condition is detected the identified brake pressure is reestablished without the requirement of pressure sensors for measuring the brake pressures applied to the individual wheel brakes. Particularly, in this invention the current and terminal voltage of the DC torque motor are monitored and a component of the motor current that is a measure of the brake pressure established by the DC torque motor is determined. This motor current is utilized in the wheel lock control system for estimating the tire torque established during braking. The component of the motor current representing brake pressure corresponding in time to the peak calculated braking force is stored. When an incipient wheel lockup condition is detected indicating that the critical wheel slip value establishing the peak braking force between the wheel and road surface has been exceeded, the stored motor current is the current representative of the brake pressure producing substantially the peak braking force. This motor current is reestablished to produce the peak braking force to establish a braking condition in which the wheel slip is substantially at the critical slip value for the existing road-tire interface condition.

In order to extract the component of motor current that is a measure of the brake pressure, the DC motor voltage is controlled according to the vehicle operator's brake command input to establish power assisted braking. When voltage controlled, the component of the motor current that is a measure of the brake pressure is extracted and utilized in the control of the electric motor during wheel lock controlled braking. In this respect, after an incipient wheel lockup condition is detected, the motor current is commanded for reapplying the brake pressure at the level determined to produce substantially the maximum braking effort.

DESCRIPTION OF THE DRAWINGS

The invention may be best understood by reference to the following description of a preferred embodiment and the drawings in which.

DESCRIPTION OF THE PREFERRED EMBODIMENT

A wheel under the influence of braking has two major torques acting on it: brake torque and tire torque. Brake torque arises from the application of brake pressure through the brake mechanism and tire torque is generated by the friction of the tire-road interface as wheel slip occurs.

Brake torque $T_b$ is assumed to be proportional to brake pressure $P_b$ with a known brake gain $K_b$ and is defined by the expression $$T_b = P_b K_b. \quad (1)$$

Tire torque $T_t$ is related to the brake force coefficient $\mu$ between the tire and the road surface, the normal load N on the tire and the wheel rolling radius R and is defined by the expression $$T_t = \mu NR. \quad (2)$$

For the free body consisting of the brake, wheel, and tire, the equation of motion is $$I_W \dot{\omega} + T_b - T_t = 0 \quad (3)$$

where $I_W$ is the wheel moment of inertia and $\omega$ is the wheel angular acceleration. When the difference between the tire torque and the brake torque is positive, the wheel accelerates and when negative, the wheel decelerates. Combining expressions 1 and 3 tire torque $T_t$ is defined as $$T_t = I_W \dot{\omega} + P_b K_b. \quad (4)$$

Figure 1:
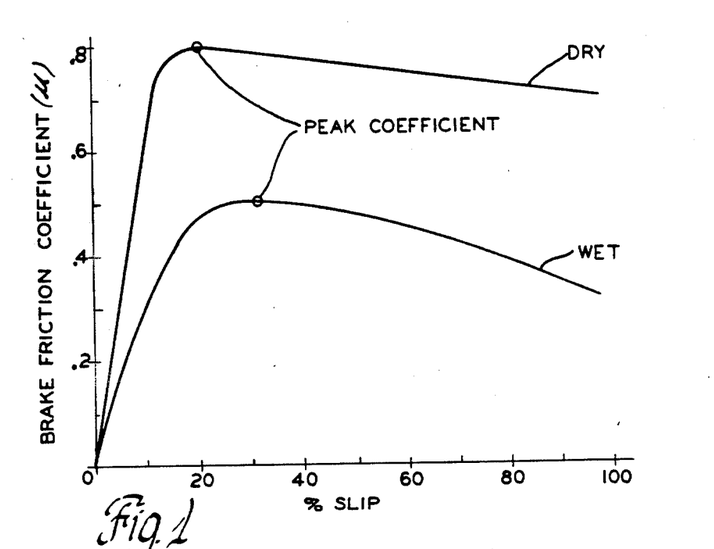
FIG. 1 is a diagram illustrating the brake force coefficient between a wheel and a road surface as a function of the percentage slip between the wheel and road surface for two road surface conditions.

The brake friction coefficient term $\omega$ of the tire torque is a non-linear function of the magnitude of slip between the wheel and the road surface during braking and is dependent upon the road surface condition. FIG. 1 illustrates the brake friction coefficient $\omega$ as a function of percentage wheel slip for two road surface conditions. For a given road surface, it can be seen that as wheel slip is increased in response to increased brake torque $T_b$, the brake friction coefficient $\mu$ and therefore the tire torque $T_t$ increases until a critical slip value at which the brake friction coefficient and the tire torque are at a maximum. A further increase in wheel slip results in a decrease in the tire torque due to a decrease in the brake friction coefficient and high wheel deceleration values. The maximum tire torque resulting in a maximum braking effort for a given road surface is achieved when the brake torque $T_b$ produces the critical wheel slip value. When the braking effort produces a wheel slip exceeding the critical slip value, the braking operation becomes unstable and typically results in sudden wheel lockup which in turn results in increased stopping distance and a deterioration in the steering and lateral stability of the vehicle.

Figure 2:
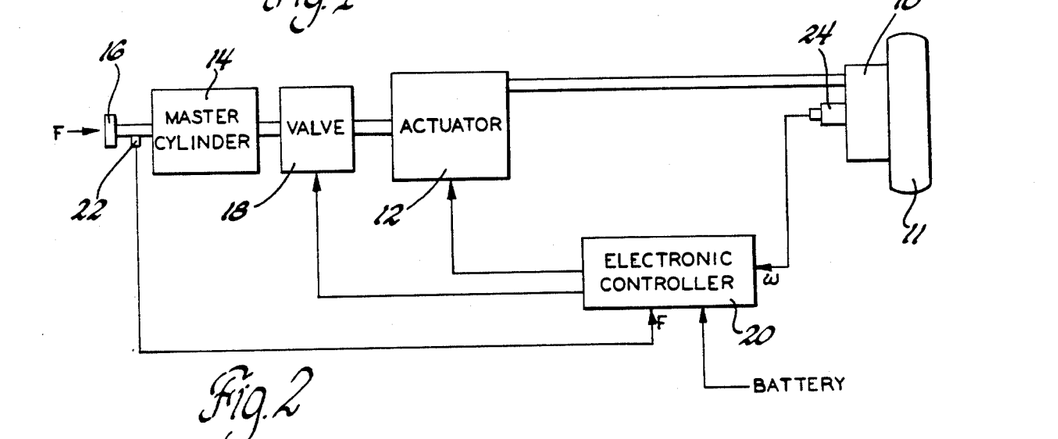
FIG. 2 is a general diagram of the braking system for controlling the brakes in accord with the principles of this invention.

A general overview of the wheel lock control system is illustrated in FIG. 2. The control of the brake of a single wheel is illustrated, it being understood that the control of the brakes of the remaining wheels of the vehicle are identical thereto. A standard wheel brake 10 for a wheel 11 is actuated by controlled hydraulic pressure from one of two sources. The primary source is a DC torque motor driven actuator 12 and the secondary source is a standard master cylinder 14 controlled directly by the vehicle brake pedal 16. A normally open electromagnetic valve 18 is energized when the actuator 12 is operative to control the hydraulic pressure to the brake 10 so as to decouple the master cylinder 14 and the brake pedal 16 from the hydraulic pressure output of the actuator 12. When the electromagnetic valve 18 is deenergized, the hydraulic pressure to the brake 10 may be modulated directly by the brake pedal 16 and the master cylinder 14.

The valve 18 is deenergized only during limited vehicle operating conditions such as during failed conditions of the primary hydraulic pressure source to permit brake pressure modulation by the master cylinder 14. At all other times, the valve 18 is energized to decouple the master cylinder 14 from the braking system.

An electronic controller 20 is responsive to the outputs of a brake pedal force sensor 22 providing a signal that is a measure of the operator applied brake pedal force F and a wheel speed sensor 24 that provides a signal that is a measure of wheel speed $\omega$. The electronic controller 20 is responsive to those signals to energize the valve 18 in the absence of a sensed failed condition of the primary hydraulic pressure source and control the hydraulic pressure applied to the wheel brake 10 via the motor controlled actuator 12.

Figure 3:
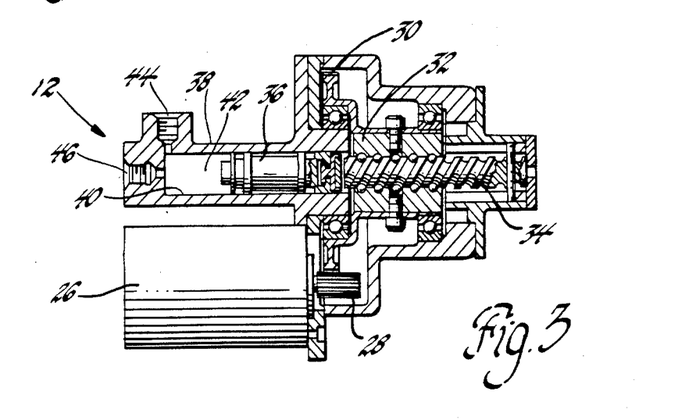
FIG. 3 is a longitudinal cross-sectional view of the actuator of FIG. 2 for modulating the brake pressure.

Referring to FIG. 3, the actuator 12 includes a DC torque motor 26 whose output shaft drives an input gear 28 which in turn rotatably drives an output gear 30. The drive member 32 of a ball screw actuator is secured for rotation with the output gear 30. The drive member 32 engages and axially positions the driven member 34 of the ball screw actuator. The driven member 34 drives a piston 36 to control the hydraulic pressure output of the actuator 12. In summary, the torque output of the motor 26 is translated into a directly related hydraulic pressure output of the actuator 12 that is applied to the respective brake of the vehicle wheels.

As more particularly illustrated in FIG. 3, the actuator 12 includes a housing 38 in which a cylinder 40 is formed. The piston 36 is reciprocally received in the cylinder 40 and defines therewith a chamber 42. The cylinder 40 has an inlet 44 operatively connected to the master cylinder 14 via the valve 18. The actuator 12 has an outlet 46 from the chamber 42 which is connected to the wheel brake 10.

In general, the electronic controller 20 identifies the value of the braking pressure $P_b$ that corresponds in time to the maximum tire torque $T_t$. This is accomplished by continuously estimating the tire torque value $T_t$ of equation 4 during braking. Any time the estimated value is larger than any previous estimated value, the value of the tire torque and the braking pressure $P_b$ is stored so that the maximum tire torque and brake pressure corresponding in time therewith are known. When an incipient wheel lockup is detected, the brake pressure is dumped to allow the wheel speed to recover and the brake pressure is thereafter reapplied to the stored value to establish a braking condition in which the wheel slip is substantially at the critical slip value for the existing road surface condition. This results in substantially the maximum possible tire torque $T_t$ and the minimum stopping distance for the road surface condition.

Previously, the value of the braking pressure $P_b$ was established by directly measuring the pressure of the hydraulic fluid applied to the brake 10 from the actuator 12 by means of a pressure sensor. However and in accord with this invention, the brake pressure utilized in equation 4 to establish the estimated value of tire torque $T_t$ is determined based on the terminal voltage and the current of the DC torque motor 26 of FIG. 3. The dynamics of the DC torque motor 26 are governed by the relation $$V_m = L\, dI_m/dt + RI_m + K_T \omega_m \tag{5}$$

where $V_m$ is the motor terminal voltage, $I_m$ is the motor current, L is the motor phase winding inductance, R is the motor phase winding resistance, $K_T$ is the induced EMF or torque constant of the motor, and $\omega_m$ is the speed of the motor rotor.

The electromagnetic torque generated by the motor is $$T_m = K_T I_m \tag{6}$$

and it is used for (A) accelerating the rotor in response to the commanded change in the brake pressure such as by the vehicle operator and (B) overcoming the brake pressure.

The portion of the motor current $I_m$ required to overcome the brake pressure is representative of the value of the brake pressure applied to the brake 10 from the actuator 12 and is used as a measure thereof. If $I_p$ is denoted for this component of the motor current, the motor torque equation can be written as $$K_T I_m = J_m\, d\omega_m/dt + K_T I_p \tag{7}$$

where $J_m$ is the rotor inertia.

The inductance term of equation 5 is usually very small and can be neglected. Therefore the equation 5 for the dynamics of the DC torque motor 26 may be defined as $$V_m = RI_m + K_T \omega_m. \tag{8}$$

From equation 8, the acceleration of the motor rotor can be estimated by the expression $$d\omega_m/dt = K_T^{-1} d(V_m - RI_m)/dt. \tag{9}$$

Substituting equation 9 into equation 7 yields the current component $I_p$ which is the current component associated with overcoming brake pressure as follows:

$$I_p = I_m - J_m(dV_m/dt - R\, dI_m/dt)/K_T^2. \tag{10}$$

Since this current has a value proportional to the brake pressure applied to the brake 10 from the actuator 12, it can be used as the brake pressure value of equation 4 in the estimation of the tire torque value. Substituting $I_p$ into equation 4 and letting $I_w$ equal $K_1$ yields the following equation for tire torque:

$$T_t = K_1 \dot{\omega} + K_2 I_p \tag{11}$$

where $K_2$ is a known constant relating the motor current component $I_p$ to the brake torque established by the corresponding brake pressure.

During transient braking conditions (such as normal braking where the brake pressure is controlled in response to the operator applied brake pedal force F which is typically changing) where the position of the rotor of the motor 26 in controlling the brake pressure is changing, a portion of the motor current $I_m$ is associated with the torque required to accelerate the rotor and the remaining portion ($I_p$) is associated with the motor torque establishing the brake pressure. In order to provide a measure of the value of brake pressure and to estimate the value of tire torque in accord with the equation 11, it is necessary to determine the component $I_p$ of the motor current $I_m$ associated with the application of brake pressure. This is accomplished in the present invention by controlling the DC torque motor 26 by application of a controlled voltage to control the brakes during transient braking conditions. With the known value of the controlled voltage and by monitoring the current through the motor 26, the current component $I_p$ representing brake pressure can be determined in accord with equation 10. The value of this current corresponding in time to the maximum calculated value of tire torque is stored during application of brake pressure to the wheel brake 10 as previously described so that when an incipient wheel lockup is detected, the stored value represents the brake pressure establishing the critical wheel slip value resulting in the maximum tire torque.

During other braking conditions, it is desirable to establish a predetermined constant brake pressure such as during wheel lock controlled braking where the brake pressure is controlled to the value establishing substantially the maximum tire torque. This is accomplished in the present invention by controlling the DC torque motor 26 by application of a controlled current to establish the desired brake pressure. With this controlled condition, the motor rotor assumes a constant position so that the motor current component associated with the rotor dynamics is zero and the value of $I_p$ representing the brake pressure is equal to the motor current $I_m$.

Figure 4:
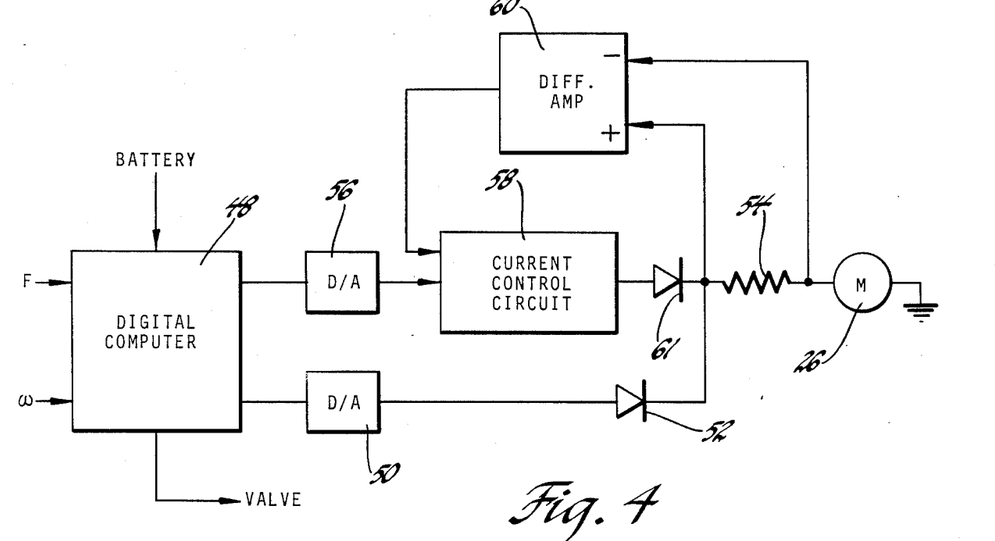
FIG. 4 is a diagram of the electronic controller for controlling the brake pressure to the wheel brakes.

The electronic controller 20 of FIG. 2 for controlling the DC torque motor 26 is illustrated in FIG. 4. The electronic controller 20 includes a digital computer 48 for controlling the torque motor 26 and the valve 18 in response to inputs including the signal F representing the operator commanded brake pressure and wheel speed $\omega$ according to an operating program permanently stored in memory. The digital computer thus includes input/output circuitry for receiving and outputting the various input and control signals and a microcomputer for processing the input signals and carrying out the control algorithm. Design details of such circuits and devices are well known to those skilled in the art of electronic controls, and are therefore not presented herein.

The digital computer 48 provides one digital output to a digital-to-analog converter 50 representing a commanded voltage to be applied to the motor 26 during a voltage control mode of operation of the actuator 12. This voltage is applied through a blocking diode 52 and a current sensing resistor 54 to the motor 26. The resistance of the current sensing resistor 54 is small so that the voltage across it is negligible as compared to the voltage across the motor 26. The digital computer 48 also provides a second digital output to a digital-to-analog converter 56 representing a commanded motor current. The analog signal representing the commanded current level is applied to a current control circuit 58 which compares the commanded motor current with the actual motor current provided by a differential amplifier 60 monitoring the voltage across the current sensing resistor 54. The current control circuit 58 may include proportional and integral control circuits which provide for establishing a current through the motor 26 as sensed by the current sensing resistor 54 at the commanded level. An isolation diode 61 is provided at the output of the current control circuit 58. When the digital computer 48 is controlling the motor in a voltage control mode via the output of the digital-to-analog converter 50, the commanded current level applied to the digital-to-analog circuit 56 is zero resulting in a low output from the current control circuit 58. Conversely, when the motor 26 is being current controlled, the signal from the digital computer 48 to the digital-to-analog converter 50 is zero.

Figure 5:
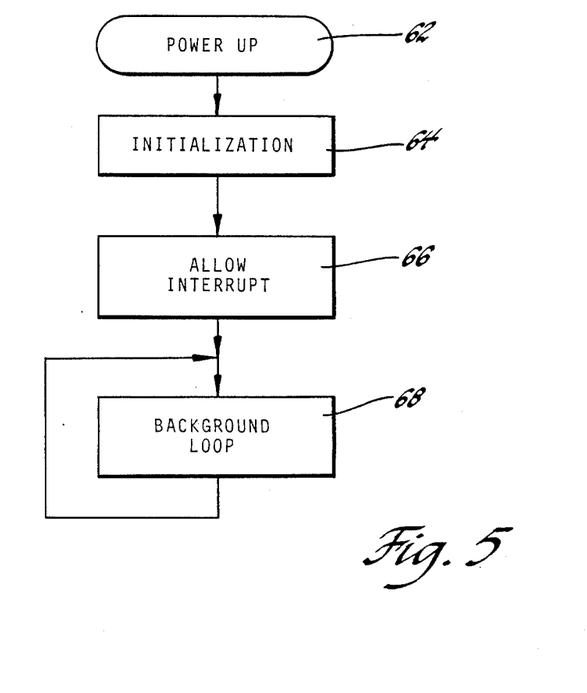
FIGS. 5 through 9 are diagrams illustrating the operation of the brake controller of FIG. 4.

The operation of the electronic controller 20 in controlling the motor 26 to establish the braking pressure applied to the brake 10 of the wheel 11 is illustrated in FIGS. 5-9. Referring first to FIG. 5, when power is first applied to the system such as when the vehicle switch is rotated to its ON position, the computer program is initiated at point 62 and then proceeds to a step 64 where the computer 48 provides for system initialization. At this step, for example, initial value stored in a read only memory may be entered into random access memory locations and various counters, flags and timers may be initialized.

After the initialization step 64, the program proceeds to a step 66 where the program conditions the digital computer 48 to allow interrupts to occur and then to a background loop 68 which is continuously repeated. This loop may include, for example, diagnostic routines. In the preferred embodiment of this invention, an interrupt is provided by the digital computer 48 at 5 millisecond intervals. Following each interrupt, the execution of the background loop 68 is interrupted and the routines for controlling the actuator 12 so as to establish controlled hydraulic pressure to the brake 10 are executed.

Figure 6:
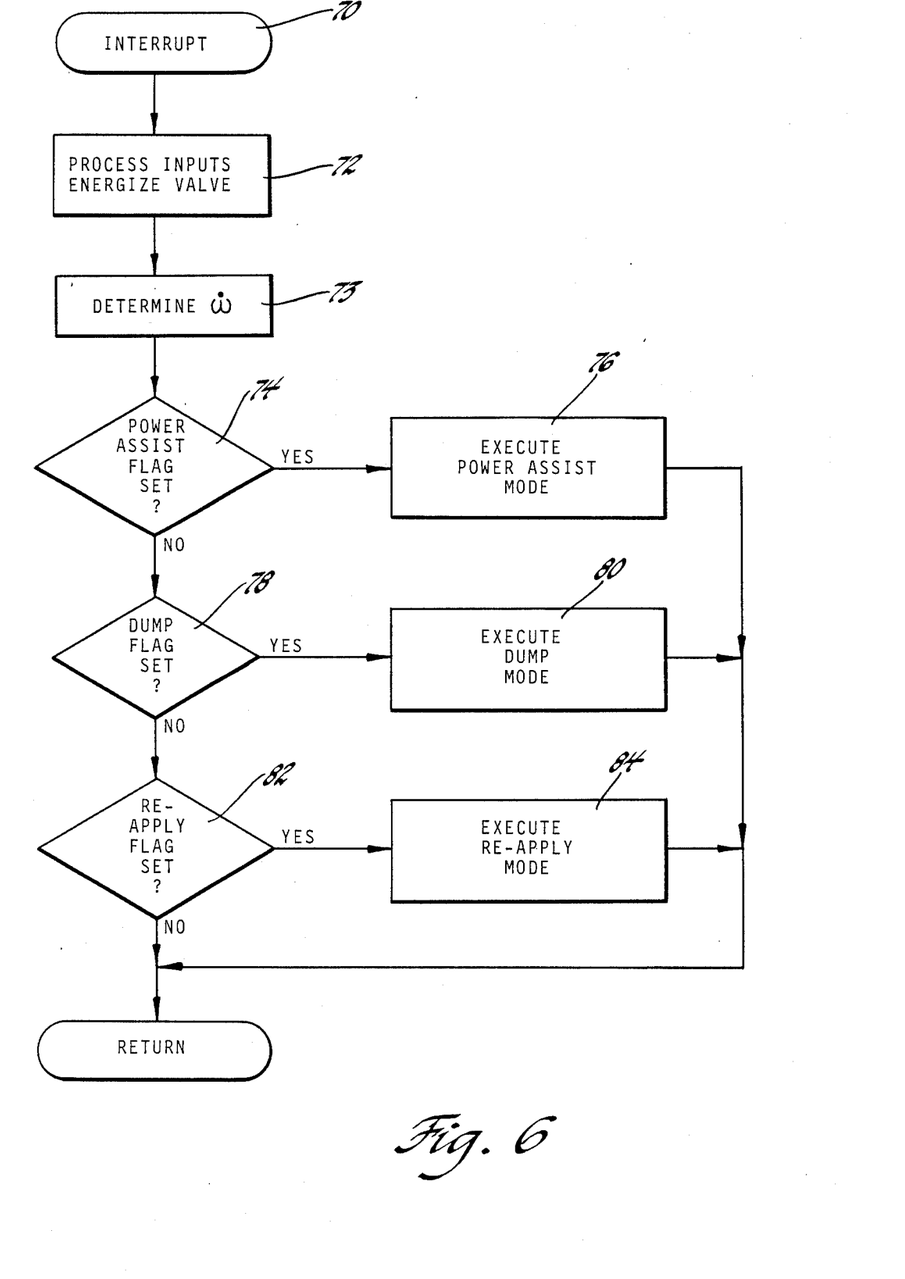

Referring to FIG. 6, the 5 millisecond interrupt routine for controlling the vehicle brake 10 via the actuator 12 is illustrated. This routine is entered at point 70 and proceeds to a step 72 where the last determined value of wheel speed $\omega$ is saved and the various inputs to the digital computer including the signal F representing the force supplied to the brake pedal 16 and the wheel speed signal $\omega$ provided by the speed sensor 24 are processed and stored. Also at this step, the valve 18 is energized. At step 73, wheel acceleration $\dot{\omega}$ is determined from the old value of wheel speed saved at step 72 and the new value stored at step 72.

From step 73, the program proceeds to a step 74 where the condition of a power assist flag is sensed. This flag is initially set during the initialization routine 64 of FIG. 5. Accordingly, the program proceeds directly to a step 76 where the program executes a power assist mode of controlling the actuator 12 whereby the terminal voltage of the DC torque motor 26 is commanded according to the foot pedal force input F as established by the vehicle driver.

During the power assist routine, the motor current $I_m$ is monitored and the component $I_p$ of the motor current that is a measure of the brake pressure applied to the brake 10 is calculated as well as the tire torque $T_t$. The value of $I_p$ corresponding in time to the maximum calculated tire torque is stored. Following execution of the step 76, the program returns to the background loop 68. The foregoing steps of FIG. 6 are repeated until step 76 senses an impending wheel lock condition. When an incipient wheel lock condition is detected, the stored value of the current component $I_p$ represents the brake pressure establishing the critical wheel slip value and and therefore the peak braking force. Also, when an impending wheel lock is detected at step 76, the power assist flag is reset and a dump flag is set to condition the program to execute a dump mode routine.

During the next execution of the interrupt routine, the program then proceeds directly from step 74 to a step 78 where the state of the dump flag is sampled. Since this flag was set at step 76, the program proceeds to execute a dump mode routine at step 80 where the brake pressure is dumped to allow the wheel speed to recover from the incipient wheel lock up condition. From step 80, the program returns to the background loop 68. When the wheel speed has recovered, the dump mode routine of step 80 resets the dump flag and sets a reapply flag to condition the program to reapply braking pressure to the wheel.

During the next execution of the interrupt routine, the program proceeds from step 74 and step 78 to a step 82 where the reapply flag is sampled. Since this flag was set at step 80, the program proceeds to a step 84 where a reapply mode is executed. At this step, the current through the DC torque motor 26 is initially established at the value previously determined to produce the critical wheel slip value and therefore the maximum tire torque.

During the next repeated executions of the interrupt routine, the step 84 ramps the controlled motor current so as to increase the brake pressure applied to the brake 10. Due to the low ramping rate, the current through the motor 26 is comprised solely of the component $I_p$ representative of the brake pressure applied to the brake 10 since the current component associated with rotor dynamics is substantially zero. Therefore, the current through the DC torque motor 26 during this current control mode continuously represents the brake pressure applied to the brake 10.

During the ramping of the motor current by the reapply mode step 84, the program calculates the tire torque $T_t$ and stores the motor current $I_m$ corresponding in time to the peak determined tire torque value in the same manner as previously described with respect to step 76. When the motor current has been ramped to a level producing a brake pressure causing an incipient lockup condition, the step 84 functions to reset the reapply flag and set the dump flag to condition the program to again execute the dump mode routine of step 80 as previously described.

Whenever the reapply mode at step 84 senses that the brake pressure commanded by step 84 exceeds the brake pressure commanded by the vehicle operator, the step 84 resets the reapply flag and sets the power assist flag so that the program thereafter executes the power assist mode routine of step 76 to establish power assisted braking.

Figure 7:
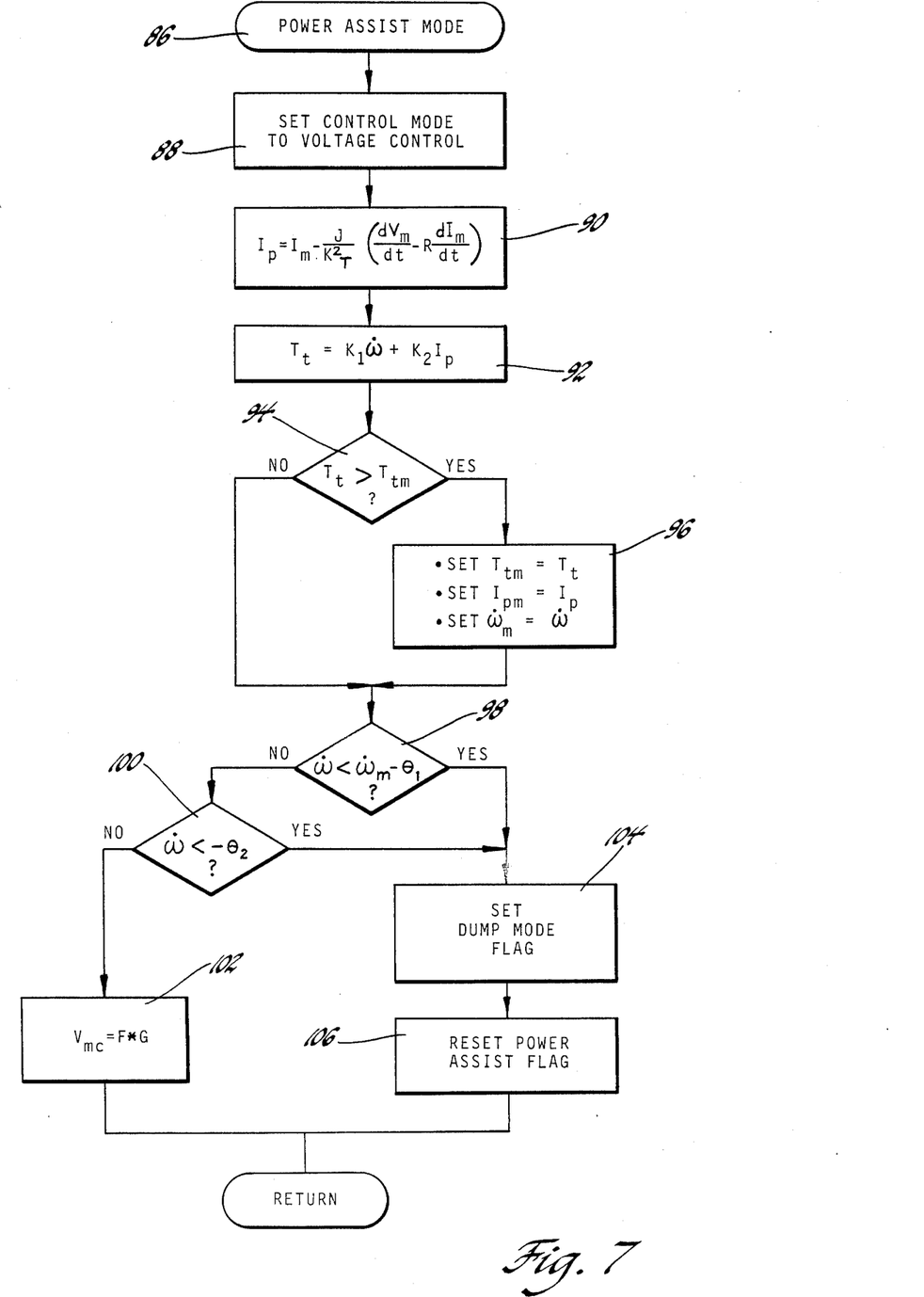
Figure 8:
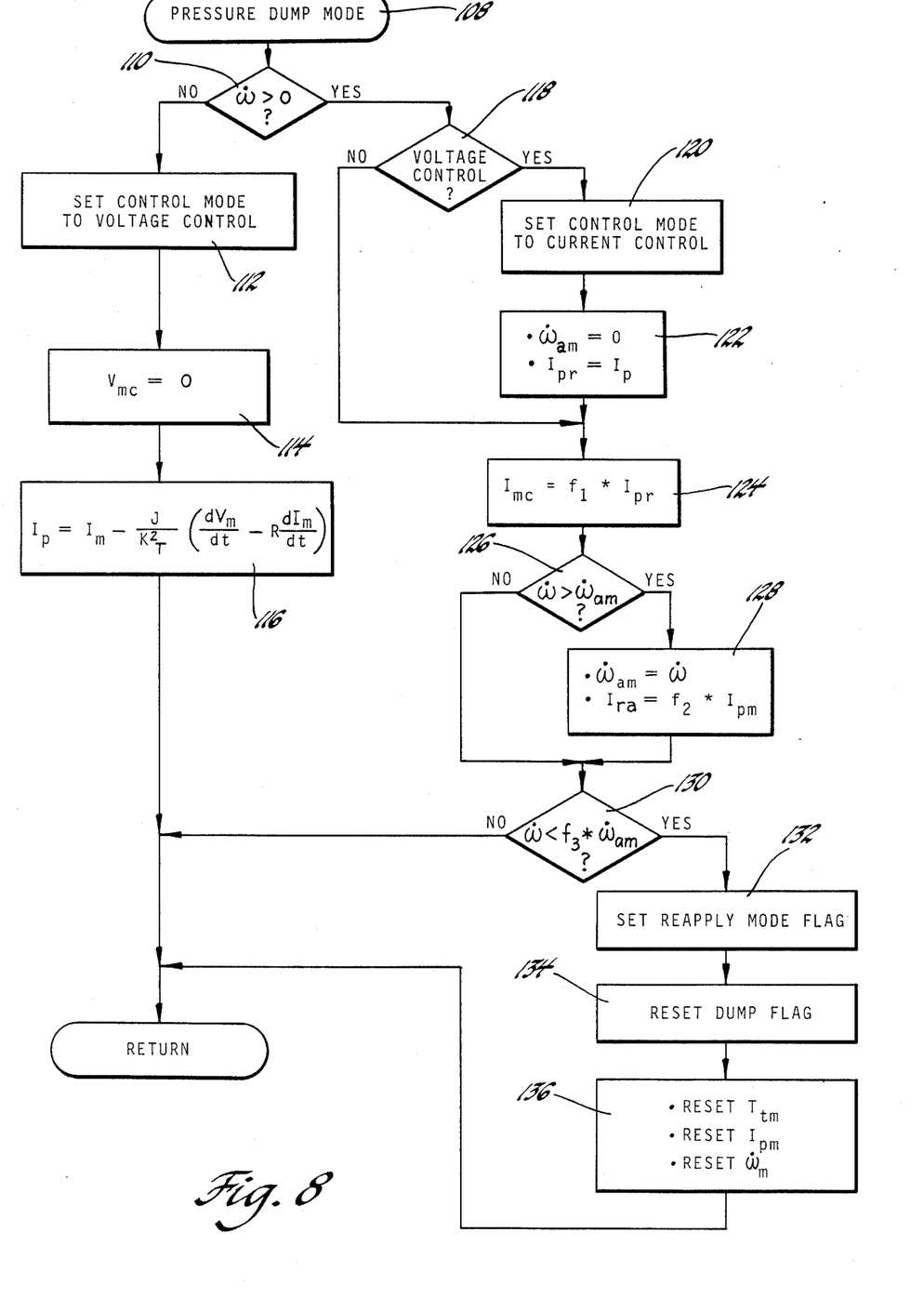
Figure 9:
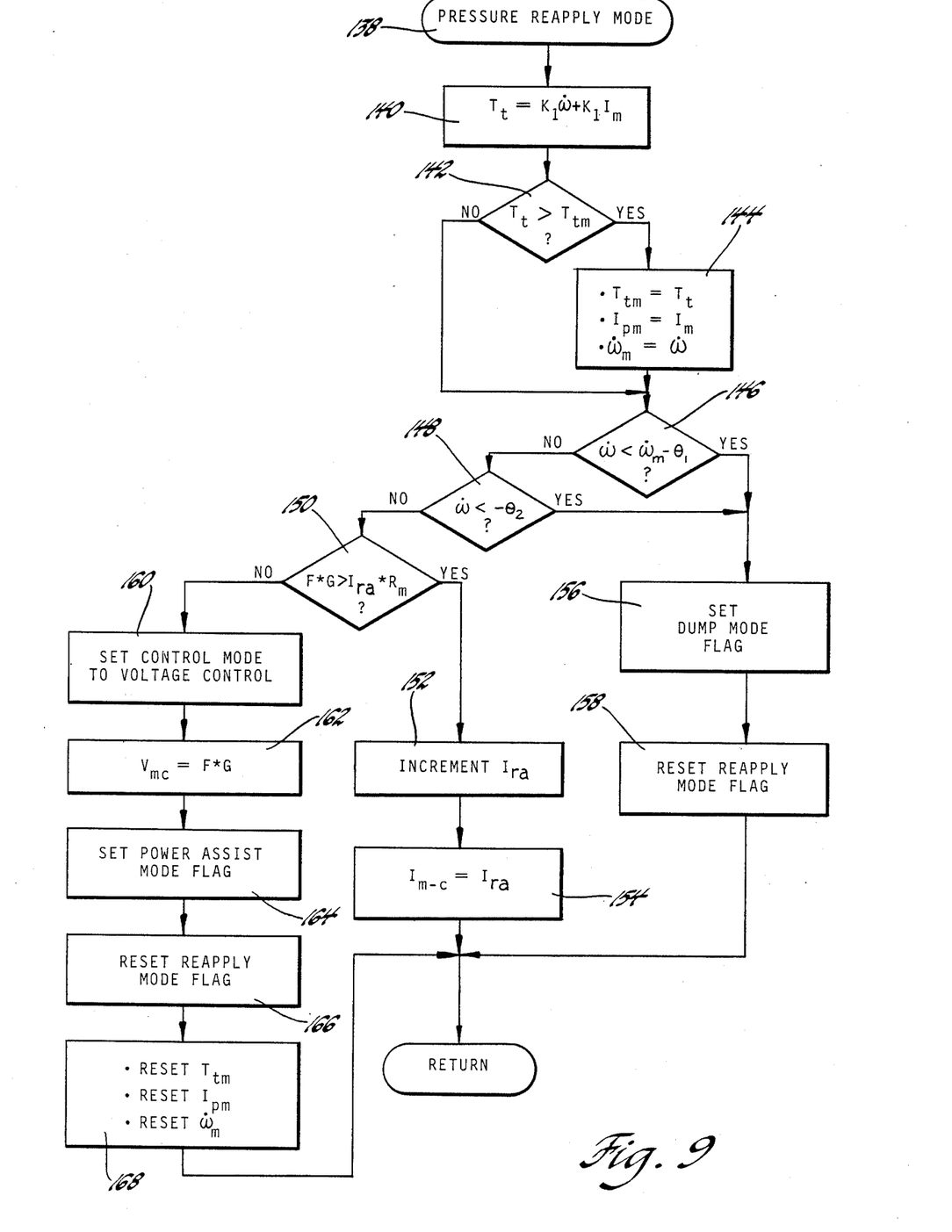

The power assist, dump and reapply modes of steps 76, 80 and 84 are illustrated in detail in FIGS. 7, 8 and 9. First referring to FIG. 7, the power assist mode of step 76 is illustrated. This mode is entered at step 86 and proceeds to a step 88 where the motor control mode is set to voltage control. When this condition exists, the commanded current output to the digital-to-analog converter 56 is set to zero.

At step 90, the program proceeds to determine the current component $I_p$ that is a measure of the brake pressure applied to the brake 10 using equation 10. From step 90, the program proceeds to a step 92 where the value of tire torque $T_t$ is calculated in accord with the equation 11 from the wheel deceleration determined at step 73 and the motor current component $I_p$ calculated at step 90.

From step 92, the program proceeds to steps 94 and 96 that function to identify the value of $I_p$ and therefore the brake pressure corresponding in time to the maximum value of tire torque. At step 94, the tire torque $T_t$ calculated at step 92 is compared with the largest previously calculated value $T_{tm}$ stored in memory. If the value of $T_t$ calculated at step 92 is greater than the stored value of $T_{tm}$, the program proceeds to a step 96 where (A) the stored value of $T_{tm}$ is set equal to the larger value calculated at step 92, (B) a stored value of motor current $I_{pm}$ is set equal to the value of $I_p$ determined at step 90 and (C) a stored value of wheel deceleration $\dot{\omega}_m$ ($\dot{\omega}_m$ having a negative value since the wheel is decelerating) is set equal to the value determined at step 73.

The foregoing sequence of steps 94 and 96 are repeated with each execution of the power assist mode as long as the estimated tire torque determined at step 92 is increasing. If step 94 should determine that the calculated value of tire torque $T_t$ is less than the stored maximum value $T_{tm}$, step 96 will be bypassed. This will occur when the brake pressure applied to the brake 10 results in a wheel slip that exceeds the critical slip value which in turn results in a decrease in the tire torque. The stored value of the motor current component $I_p$ corresponds in time to the maximum braking effort whereat the wheel is at the critical slip value.

The program next determines whether or not an incipient wheel lock condition exists. At step 98, the program determines if the wheel deceleration is greater than the deceleration stored at step 96 by a predetermined amount $\theta_1$. This condition represents the wheel slip has exceeded the critical slip value and the wheel is decelerating toward a lock up condition. If step 98 indicates the wheel is not approaching an incipient lockup condition, the program proceeds to a step 100 where the wheel deceleration is compared to a negative acceleration value $-\theta_2$ representing a high level of wheel deceleration. This value is indicative of a wheel approaching an incipient wheel lockup condition under all braking conditions.

If step 100 determines that an incipient wheel lock condition does not exist, the program proceeds to a step 102 where a motor control voltage $V_{mc}$ is set to a value equal to the operator commanded brake force F multiplied by a power assist gain value G. This value is provided to the digital-to-analog converter 50 of FIG. 4 to establish a control voltage for the motor 26 to provide for power assisted braking in accord with the operator commanded value. From step 102, the program returns to the background loop 68.

If either of the steps 98 or 100 determines that an incipient wheel lockup condition exists, the program proceeds to a step 104 where the dump mode flag is set to condition the interrupt routine to execute the dump mode routine of step 80. Thereafter at step 106, the power assist flag is reset so that the power assist mode routine of step 76 is bypassed during subsequent executions of the interrupt routine of FIG. 6.

The pressure dump mode of step 80 of FIG. 6 that is executed whenever an incipient wheel lockup condition is sensed is illustrated in FIG. 8. The pressure dump mode is entered at point 108 and proceeds to a step 110 to determine whether or not the wheel 11 is accelerating. If the wheel acceleration value is less than zero indicating the wheel is still decelerating after a sensed incipient lockup condition, the program proceeds to a step 112 where the motor control mode is set to voltage control whereat the output of the digital computer to the digital-to-analog converter 56 is set to zero.

At step 114, the motor command volta $V_{mc}$ provided to the digital-to-analog converter 50 is set to zero. This establishes a zero motor voltage to effect a reduction in the pressure applied to the brake 10. When the commanded motor voltage is $V_{mc}$ first set to zero, the current to the motor begins to decay resulting in a decay of the hydraulic pressure from the actuator 12 to the brake 10. The value of the component $I_p$ of the motor current that is a measure of the brake pressure applied to the brake 10 from the actuator 12 is determined at step 116 during each interrupt period while the wheel is decelerating. From step 116, the routine returns to the background loop 68.

As the motor current decays and the pressure to the brake 10 is reduced as a result, the wheel deceleration decreases until the pressure is reduced to the point where the wheel again begins to accelerate toward vehicle speed. This condition is sensed at step 110 when the wheel acceleration becomes greater than zero after which the program proceeds to a step 118 where the program determines whether the motor is in a voltage control or a current control mode. If in a voltage control mode which is the condition when wheel acceleration is first sensed during wheel speed recovery, the program proceeds to a step 120 where the control mode is set to a current control mode at which the output to the digital-to-analog converter 50 is set to zero. Thereafter at step 122, a stored value $\dot{\omega}_{am}$ representing the maximum wheel acceleration during wheel speed recovery is set to zero. Also at this step, the value of motor current $I_{pr}$ representing the value of $I_p$ and therefore brake pressure when the wheel first begins to accelerate during wheel speed recovery is set equal to the last determined value of $I_p$ at step 116. During subsequent executions of the pressure dump mode of FIG. 8, step 118 functions to bypass the steps 120 and 122.

From step 122 during the first execution of the routine when the wheel begins to accelerate during wheel speed recovery or thereafter from step 118, the program proceeds to a step 124 where the motor command current $I_{mc}$ is set equal to a predetermined fraction $f_1$ of the value of $I_{pr}$ established at step 122. In one embodiment, $f_1$ is 0.75. This motor current value represents a constant brake pressure to be maintained while the wheel speed recovers toward vehicle speed following an incipient wheel lockup condition.

At the next step 126, the program compares the wheel acceleration to the stored value of the maximum wheel acceleration $\dot{\omega}_{am}$ detected during wheel speed recovery. If the wheel acceleration is increasing, the program proceeds to a step 128 where $\dot{\omega}_{am}$ is set equal to the last measured value of wheel acceleration. Also at step 128, the motor reapply current $I_{ra}$ to be applied to the motor following wheel speed recovery is set equal to a predetermined fraction $f_2$ of the stored motor current $I_{pm}$. It will be recalled that this value of motor current is a measure of the brake pressure corresponding in time to the maximum calculated tire torque $T_t$ when brake pressure was last applied to the wheel brake 10. The predetermined fraction in one embodiment is 0.9 so that the value of the requested brake pressure $I_{ra}$ represents a brake pressure producing a wheel slip just less than the critical slip value to establish a stable braking condition in the pressure reapply mode to be described. In another embodiment, the value of $f_2$ may be unity.

The wheel acceleration will continue to increase as the wheel slip decreases and will peak when wheel slip equals the critical slip value at which the tire torque tending to accelerate the wheel is a maximum. Therefore, the value of $\dot\omega_{am}$ stored at step 128 during repeated executions of the dump mode routine of FIG. 8 will peak when the wheel slip becomes equal to the critical slip value. Step 126 senses wheel slip becoming less than the critical slip value as represented by wheel acceleration becoming less than the peak stored value $\dot\omega_{am}$.

From step 128 or step 126 if the wheel acceleration has peaked indicating wheel slip equal to or less than the critical slip value, the program proceeds to a step 130 where the wheel acceleration is compared to a predetermined fraction $f_3$ of the peak wheel acceleration $\dot\omega_{am}$ during wheel speed recovery from the incipient wheel lock condition. Wheel acceleration decreasing to this value indicates wheel speed recovery from the incipient wheel lock up condition. In one embodiment, $f_3$ is 0.5. However in another embodiment, $f_3$ may be unity. As long as the wheel acceleration remains greater than this value, the program exits the pressure dump mode routine from step 130. However, if the wheel acceleration has decreased below the fraction $f_3$ of the maximum acceleration detected during wheel speed recovery, the wheel has recovered from the incipient wheel lockup condition and the program proceeds from step 130 to a step 132 where the reapply mode flag is set to condition to the interrupt routine to execute the reapply mode at step 84. At the next step 134, the pressure dump mode flag is reset.

At step 136, the stored values of peak tire torque $T_{tm}$, motor current $I_{pm}$ and wheel deceleration $\dot\omega_m$ are reset to condition the system to again identify the motor current $I_{pm}$ representing the brake pressure establishing the maximum tire torque. From step 136, the program exits the pressure dump mode routine of FIG. 8. After the dump mode routine of step 80 has sensed a wheel speed recovery from an incipient wheel lockup condition and has set the reapply mode flag, the interrupt routine of FIG. 6 executes the reapply mode routine at step 84 and which is illustrated in FIG. 9. This mode is entered at step 138 and proceeds to a step 140 where the tire torque $T_t$ is estimated based on equation 11 in the same manner as step 92 in the power assist mode of FIG. 7. However, at step 140, the measured motor current $I_m$ is utilized in equation 11 in place of $I_p$ since $I_m$ is substantially equal to $I_p$ when the motor current is being controlled since the rotation rate of the motor rotor is very small.

From step 140, the program proceeds to steps 142 and 144 that function in identical manner as the steps 94 and 96 in the power assist mode to identify the motor current that is a measure of the brake pressure producing the maximum value of tire torque and the wheel deceleration corresponding thereto.

At steps 146 and 148, the program determines whether or not an incipient wheel lockup condition exists utilizing the same parameters as previously described with respect to steps 98 and 100 of the power assist mode of FIG. 7. Assuming the conditions do not represent an incipient wheel lockup condition, the program proceeds to a step 150 where the operator commanded braking effort represented by a motor terminal voltage equal to F*G is compared to the braking effort represented by the motor terminal voltage established by the requested current $I_{ra}$ times the motor winding resistance R. If the braking force established by the motor current $I_{ra}$ is less than the operator commanded braking effort indicating controlled braking in response to an incipient wheel lockup condition, the program proceeds to a step 152 where the requested motor current $I_{RA}$ is incremented. Thereafter, the program proceeds to a step 154 where the commanded motor current $I_{mc}$ is set equal to the requested motor current value $I_{ra}$. This motor current command value is provided by the digital computer 48 to the digital-to-analog converter 56 of FIG. 4. Following step 154, the program returns to the background loop 68 of FIG. 5.

During the following executions of the interrupt routine, the steps 152 and 154 of FIG. 9 function to ramp the commanded motor current to ramp the brake pressure applied to the brake 10 by the actuator 12. When the brake pressure is ramped to a level producing an incipient wheel lockup condition as sensed by step 146 or step 148. The steps 142 and 144 have again identified the motor current component $I_{pm}$ representing the brake pressure producing the maximum braking effort. When the incipient wheel lockup condition is sensed, the program proceeds to a step 156 where the dump mode flag is set to condition the program to again execute the pressure dump mode routine of FIG. 8 to dump brake pressure to allow wheel speed recovery from the incipient wheel lockup condition. At step 158, the reapply mode flag is reset after which the program returns to the background loop 68.

During the next executions of the interrupt routine, the pressure dump mode routine of FIG. 8 is executed to provide for wheel speed recovery as previously described. Upon sensing wheel speed recovery, the pressure reapply mode of FIG. 9 is again executed to reapply the previously identified motor current producing the maximum braking effort. The foregoing cycle is continuously repeated until such time that the program senses at step 150 an operator requested braking effort that is less than the braking effort established by the requested motor current $I_{ra}$. At this time, the program proceeds from step 150 to a step 160 where the motor control mode is set to voltage control. At step 162, the program commands a motor control voltage $V_{mc}$ equal to the operator commanded brake force F times the power assist gain G to provide for normal power assisted braking.

At step 164, the power assist mode flag is set to condition the program to execute the power assist mode routine of FIG. 7 previously described. At step 166, the program resets the reapply mode flag. Thereafter, at step 168, the values of the maximum tire torque $T_{tm}$, the motor current $I_{bm}$ and the wheel deceleration $\dot\omega_m$ are reset. Thereafter the program returns to the background loop 68.

The foregoing routines provide for establishing a braking pressure applied to the wheel brake 10 by the actuator 12 having a value substantially at the value producing the critical slip value and therefore the maximum tire torque during wheel lock controlled braking. This is accomplished without the requirement of a pressure sensor monitoring the hydraulic pressure applied to the wheel brake 10 but utilizes the motor terminal voltage and the motor current to determine the value of the motor current component representing the hydraulic pressure applied to the wheel brake 10.

The foregoing description of the preferred embodiment of the invention for the purpose of illustrating the invention is not to be considered as limiting or restricting the invention since many modifications may be made by the exercise of skill in the art without departing from the scope of the invention.

The embodiments of the invention in which an exclusive propoerty or privilege is claimed are defined as follows:

1. A control system for controlling the brake pressure applied to the brake of a vehicle wheel, the system comprising:

an actuator for applying a brake pressure to the brake of the wheel, the actuator including a torque motor for generating motor torque in response to motor current to control the value of the applied brake pressure;

first brake prssure control means for applying a controlled voltage to the torque motor during a first braking control mode to establish said motor current producing said motor torque to control the brake pressure, a first portion of the motor torque that is related to motor dynamics being generated in response to a first portion of the motor current and a second portion fo the motor torque producing the applied brake pressure being generated in response to a second portion of the motor current;

second brake pressure control means including (A) means for determining the value of the second portion of the motor current during the first braking control mode, (B) means for dertermining a maximum value of tire torque tending to accelerate the wheel during the first braking control mdoe, (C) means for storing the determined value of the second portion of the motor current corresponding in time to the maximum determined value of tire torque during the first braking control mode and (D) means for controlling the motor current during a second braking control mode equal to the stored value of the second portion of the motor current; and means for selecting between the first and second braking control modes, whereby the brake pressure applied to the brake during the second braking control mode is substantially equal to the brake pressure during the first braking control mode producing the maximum tire torque tending to accelerate the wheel.

2. A control system for controlling the brake pressure applied to the brake of a vehicle wheel, the system comprising:

an actuator for applying a brake pressure to the brake of the wheel, the actuator including a torque motor for generating motor torque in response to motor current to control the value of the applied brake pressure;

means for sensing the magnitude of an operator commanded braking effort;

means for applying a controlled voltage to the torque motor in accord with the operator commanded braking effort to establish said motor current generating said motor torque to control the brake pressure a first portion of the motor torque that is related to motor dynamics being generated in response to a first portion of the motor current and a second portion of the motor torque producing the applied brake pressure being generated in response to a second portion of the motor current; and wheel lock control means for limiting the brake pressure, the wheel lock control means including (A) means for determining the value of the second portion of the motor current, (B) means for determining a maximum value of tire torque tending to accelerate the wheel during each period of application of brake pressure, (C) means for storing the determined value of the second portion of the motor current corresponding in time to the maximum determined value of tire torque during each period of application of brake pressure, (D) means for detecting an incipient wheel lockup condition, (E) means for reducing the motor current to decrease the brake pressure in response to said detected incipient wheel lockup condition to allow wheel speed recovery and (F) means for controlling the motor current following wheel speed recovery to the last stored value of the second portion of the motor current to reapply a brake pressure producing substantially the last determined maximum tire torque value.

3. A control system for controlling the brake pressure applied to the brake of a vehicle wheel, the system comprising:

an actuator for applying a brake pressure to the brake of the wheel, the actuator including a torque motor having a phase winding, the torque motor generating motor torque in response to motor current $I_m$ to control the value of the applied brake pressure;

first brake pressure control means for applying a controlled voltage $V_m$ to the torque motor during a first braking control mode to establish said motor current $I_m$ producing a motor torque to control the brake pressure, a pportion of the motor torque producing the applied brake pressure being generated by a portion $I_p$ of the motor current $I_m$;

second brake pressure control means including (A) means for sensing wheel deceleration, (B) means for determining the value of the portion $I_p$ of the motor current generating the portion of the motor torque producing the brake pressure during the first braking control mode in accord with the expression:

$$I_p = I_m - J_m(dV_m/dt - R\, dI_m/dt)K_T^2,$$

where $J_m$ is the rotor inertia, R is the phase winding resistance and $K_T^2$ is a predetermined torque constant, (C) mens for determining a maximum value of tire torque $T_t$ tending to acelerate the wheel during the first brake control mode, the value of tire torque $T_t$ being determined in accord with the expression:

$$T_t = K_1 + K_2 I_p,$$

where $K_1$ and $K_2$ are predetermined constants, (D) means for storing the value of $I_p$ corresponding in time to the maximum determined vlaue of $T_t$ during the first braking control mode and (E) means for controlling the motor current $I_m$ during a second braking control mode equal to the stored value of $I_p$; and means for selecting between the first and second braking control mdoes, whereby the brake pressure applied to the brake during the second braking control mode is substantially equal to the brake pressure during the first braking control mode producing the maximum tire torque tending to accelerate the wheel.

4. A control system for controlling the brake pressure applied to the brake of a vehicle wheel, the system comprising:

an actuator for applying a brake pressure to the brake of the wheel, the actuator including a torque motor having a phase winding, the torque motor generating motor torque in response to motor current $I_M$ to control the value of the applied brake pressure;

means for sensing the magnitude of an operator commanded braking effort;

means for applying a controlled voltage $V_m$ to the torque motor in accord with the operator commanded braking effort to establish said motor current $I_m$ producing said motor torque to control the brake pressure a first portion of the motor torque that is related to motor dynamics being generated in response to a first portion of the motor current $I_m$ and a second portion of the motor torque producing the applied brake pressure being generated by a second portion $I_p$ of the motor current $I_m$;

wheel lock control measn for limiting the brake pressure, the wheel lock control means including (A) means for sensing wheel deceleration, (B) means for determining the value of the second portion $I_p$ of the motor current in accord with the expression $$I_p = I_m - J_m(dV_m/dt - R\, dI_m/dt)K_T^2,$$

where $J_m$ is the rotor interia, R is the phase winding resistance and $K_T^2$ is a predetermined torque constant, (C) means for determining a maximum value of tire torque $T_t$ tending to accelerate the wheel during each period of application of brake pressure, the value of tire torque $T_t$ being determined in accord with the expression:

$$T_t = K_1 + K_2 I_p,$$

where $K_1$ and $K_2$ are predetermined constants, (D) means for storing the value of $I_p$ corresponding in time to the maximum determined value of $T_t$ during each period of application of brake pressure, (E) means for detecting an incipient wheel lockup condition, (F) means for reducing the motor current to decrease the brake pressure in response to said detected incipient wheel lockup condition to allow wheel speed recovery and (G) means for controlling the motor current following wheel speed recovery to the last stored value of $I_p$ to reapply a brake pressure producing substantially the last determined maximum tire torque value.

* * * * *